United States Patent [19]

Trimble et al.

[11] Patent Number: 4,923,203
[45] Date of Patent: May 8, 1990

[54] COMPOSITE BICYCLE FRAME WITH CROSSED TUBULAR PORTIONS

[76] Inventors: Brent J. Trimble, 8025 Sundi Way, Anchorage, Ak. 99502; Richard H. Trimble, Box 2, 2 College St., Providence, R.I. 02093

[21] Appl. No.: 137,124

[22] Filed: Dec. 23, 1987

[51] Int. Cl.⁶ .............................................. B62K 3/14
[52] U.S. Cl. ............................ 280/288.3; 280/281.1
[58] Field of Search ............... 280/281 R, 281 B, 282, 280/270, 273, 274

[56] References Cited

U.S. PATENT DOCUMENTS

| | | | |
|---|---|---|---|
| 2,182,828 | 12/1939 | Stutsman | 280/281 R |
| 2,370,726 | 3/1945 | Hess et al. | 280/281 R |
| 2,729,466 | 1/1956 | Giordani | 280/281 R |
| 2,827,306 | 3/1958 | Roder | 280/281 R |
| 3,233,916 | 2/1966 | Bowden | 280/274 |
| 3,375,024 | 3/1968 | Bowden | 280/281 R |
| 3,493,240 | 2/1970 | Jenks | 280/11.13 |
| 3,641,230 | 2/1972 | Jenks | 264/152 |
| 3,833,242 | 9/1974 | Thompson, Jr. | 280/281 R |
| 3,884,521 | 5/1975 | Moore | 296/31 P |
| 4,015,854 | 4/1977 | Ramond | 280/281 R |
| 4,230,332 | 10/1980 | Porsche | 280/281 B |
| 4,264,389 | 4/1981 | Staub et al. | 156/156 |
| 4,368,897 | 1/1983 | Brown | 280/202 |
| 4,411,333 | 10/1983 | Bothwell | 180/219 |
| 4,471,020 | 9/1984 | McCarthy | 428/309.9 |
| 4,479,662 | 10/1984 | Defour et al. | 280/281 R |
| 4,493,749 | 1/1985 | Brezina | 280/281 R |
| 4,511,523 | 4/1985 | Hsu | 264/46.6 |
| 4,513,986 | 4/1985 | Trimble | 280/281 R |
| 4,529,216 | 7/1985 | Spekner | 280/281 R |
| 4,565,595 | 1/1986 | Whitener | 156/156 |
| 4,613,146 | 9/1986 | Sharp | 280/281 B |
| 4,657,795 | 4/1987 | Foret | 280/281 R |

FOREIGN PATENT DOCUMENTS

| | | | |
|---|---|---|---|
| 950982 | 9/1956 | Fed. Rep. of Germany . | |
| 2455141 | 3/1975 | Fed. Rep. of Germany . | |
| 2453135 | 5/1975 | Fed. Rep. of Germany . | |
| 839373 | 4/1939 | France | 280/281 R |
| 877814 | 1/1943 | France . | |
| 1367704 | 6/1964 | France | 280/281 R |
| 191124 | 5/1937 | Switzerland | 280/281 R |
| 3568 | of 1894 | United Kingdom . | |
| 902 | of 1898 | United Kingdom . | |
| 303619 | 11/1927 | United Kingdom . | |
| 591926 | 9/1947 | United Kingdom . | |
| 1361394 | 7/1974 | United Kingdom . | |
| 2117333 | 10/1983 | United Kingdom | 280/281 R |

*Primary Examiner*—Charles A. Marmor
*Assistant Examiner*—Donn McGiehan
*Attorney, Agent, or Firm*—Pollock, Vande Sande & Priddy

[57] ABSTRACT

A generally hollow bicycle frame of resin impregnated fibrous material having a main tubular portion and a cross tubular portion arranged in an X-shaped geometry as viewed from one side. A rear segment of the main portion may be slit to provide opposing rear stays for receiving a rear wheel assembly therebetween. The main tubular portion connects the head tube and the rear wheel supports and the cross tubular portion connects the bottom bracket and the seat sleeve. Both of these portions may be substantially straight and continuous from end to end and joined by a generally hollow common junction. Alternatively, the common junction may integrally unite a plurality of pre-formed tubular portions corresponding respectively to the supports for the front wheel assembly, the rear wheel assembly, the bottom bracket and the seat. The tubular portions may have round or non-circular aerodynamic cross-sectional shapes.

24 Claims, 7 Drawing Sheets

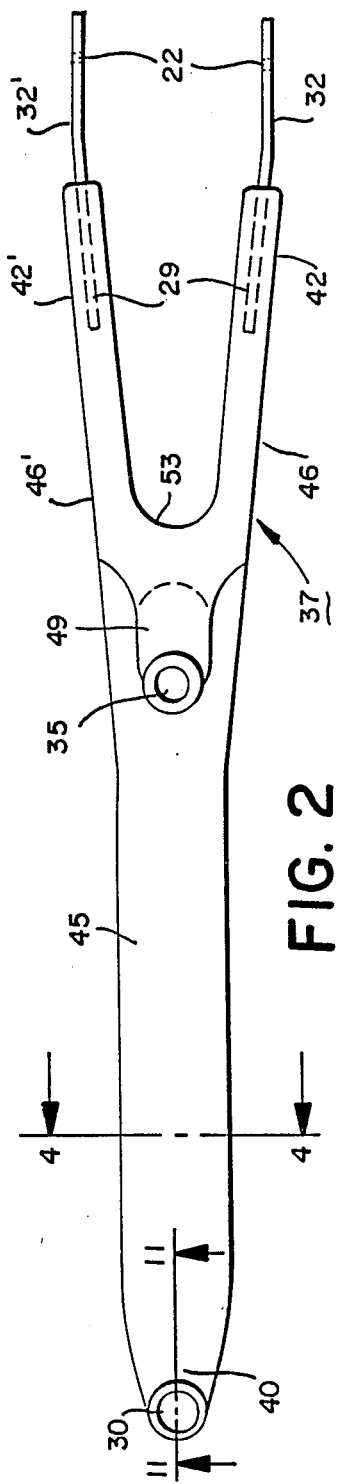
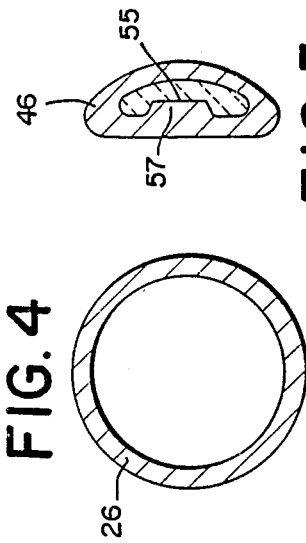
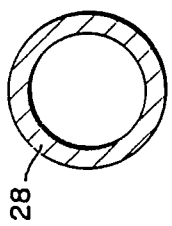
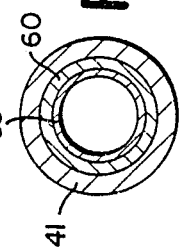
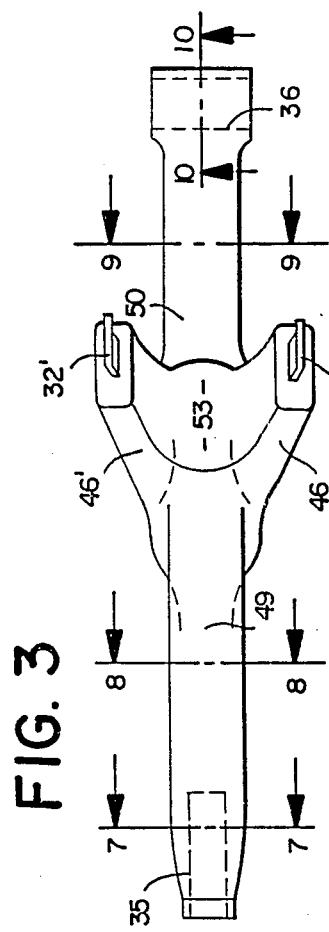

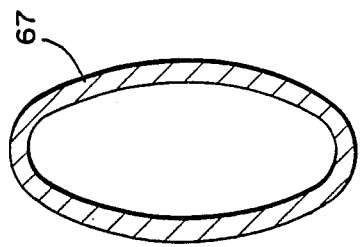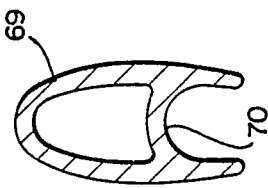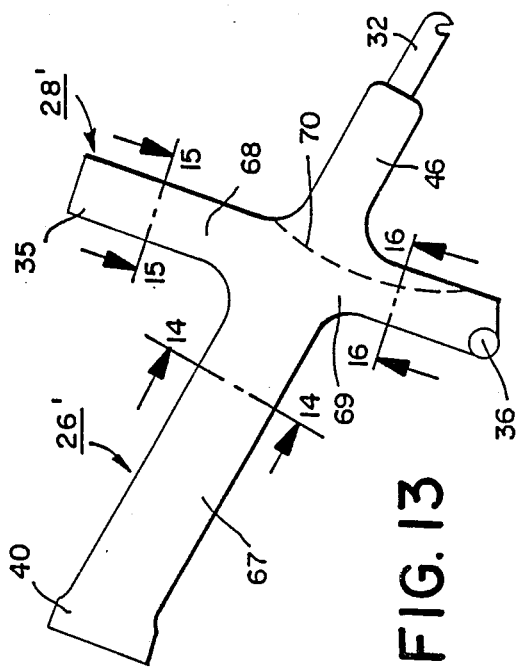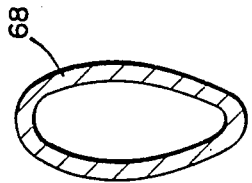

| FRAME | VERT. COMPLIANCE | | KLINE LAT./TOR. #DEFLECTION | | | FRAME |
|---|---|---|---|---|---|---|
| | LOAD | DEF. | LOAD | *LAT.(2) | *TOR.(3) | WEIGHT |
| STEEL ROAD FRAME (5) | 150# | .020" | 15# | .250" | .800" | 5.0# |
| TREK ALUM. | 150 | .022 | 15 | .150 | .600 | 3.5# |
| TRIMBLE "T" FRAME #1 | 150 | .062 | 15 | .050 | .400 | 5.0# |
| #2 | 150 | .080 | 15 | .100 | .600 | 5.0# |
| #3 | 150 | .065 | 15 | .085 | .450 | 3.5# |
| #4 | 150 | .060 | 15 | .068 | .450 | 5.0# |
| STEEL MTB RITCHEY | 150 | .016 | 15 | .100 | .650 | 6.1# |
| STEEL MTB TREK | 150 | .018 | 15 | .115 | .680 | 6.0# |
| TRIMBLE MONOCOQUE | 150 | .030 | 15 | | | 5.0# |
| KLINE | 150 | .012 | 15 | .125 | .400 | 4.0# |
| KESTREL 4000 | 150 | .014 | 15 | .200 | .700 | 3.8# |

1 VERTICLE COMPLIANCE IS 150 = LOAD APPLIED TO SEAT 30" FROM ₵ OF BOTTOM BRACKET AT ₵ OF SEAT TUBE.

2 LATERAL DEFLECTION IS 15# APPLIED TO REAR DROPOUTS.

3 TORTIONAL DEFLECTION IS 15# APPLIED TO 32" LEVER ATTACHED TO B.B. SHELL AND EXTENDING THROUGH ₵ OF SEAT TUBE.

4 TESTING IS AS PER U.S. PATENT #4,500,103 (KLEIN/FEB. 19, 1985).

5 MADE FROM COLUMBUS SL STEEL TUBING.

FIG. 20

COMPOSITE BICYCLE FRAME WITH CROSSED TUBULAR PORTIONS

TECHNICAL FIELD

The present invention relates to high performance, unusually light bicycle frames made from composite materials, and to methods of making such bicycle frames. More particularly, the present invention provides a composite bicycle frame having an improved generally hollow structure comprising two generally hollow tubular portions arranged in a crossed configuration resembling a "X" (X-frame).

BACKGROUND OF THE INVENTION

Conventional bicycle frames having a front triangle and a rear triangle require at least eight individual tubes which are secured together by welding, brazing or other fastening means to make up a usable frame assembly. The eight tubes are designated by their location relative to each other and to the other major components of a functioning bicycle. Thus, a short "head" tube supports the "head" axle joining the handlebar assembly and the front wheel fork, a "seat" tube supports the seat post and extends vertically as a column from the pedal axle support (the bottom bracket), the "top" tube connects the head tube and the top of the seat tube, the "down" tube connects the head tube and the bottom of the seat tube at the bottom bracket, a pair of "seat stays", one on either side of the rear wheel assembly, connects the top of the seat tube to the rear wheel supports, and pair of "chain stays", one on either side of the rear wheel assembly, connects the bottom of the seat tube to the rear wheel supports.

The multiplicity of connections required to secure these individual tubes and stays together, combined with the different forces encountered when the bicycle is ridden, may cause a variety of problems. For example, due to the many junctions between the tubes and stays and the nature of the fastening means required, it is not unusual for one or more of the joints or connections to fail in a manner that makes the entire frame unsuitable for use and incapable of economical repair. In addition, such frames may require many different tube shapes, further increasing the complexity of joining the shapes together, and may be relatively heavy due to the presence of the large number of structural elements and associated connections.

Conventional bicycle frames also may be of the monocoque type having a stressed, unitary outer skin assembled over stiffening ribs and other internal structural elements as illustrated by U.S. Pat. No. 4,513,986 issued Apr. 30, 1985. Instead of a unitary skin, monocoque frames may utilize two separate structural skin panels which extend parallel in spaced apart relation and are bonded to an internal core to form a three ply laminate such as illustrated in U.S. Pat. No. 4,230,332 issued Oct. 28, 1980. Although such monocoque frames may have some aerodynamic advantages over conventional triangular frames due to the aerodynamic shape of the outer skin, the unbroken plane of the outer skin may cause undesirable side wind sensitivity.

Both convention triangular frames and conventional monocoque frames have the disadvantage of requiring the manufacturing and fastening together of numerous structural pieces which is relatively time consuming and costly. The manufacture of monocoque frames may be particularly difficult and costly because of the large number of relatively small structural elements involved, including shear webs, reinforcing angles, reinforcing blocks, reinforcing strips and joining blocks, and these numerous elements after assembly must then be covered by a stress carrying structural outer skin.

Conventional triangular frames and conventional monocoque frames also may have too much compliance in torsion and lateral bending and too little vertical compliance. Increasing the torsional and lateral bending rigidity of conventional frames further reduces vertical compliance. This may result in relatively poor shock absorption and the excessive impact stresses. Unless these factors are properly balanced, bicycle handling and rider comfort are adversely affected and joints of the frame may be subjected during use to excessive stresses. The balancing of these factors is particularly critical for the frames of mountain bicycles of the type used for off road racing and touring over mountainous or other rugged terrain.

Another critical factor for mountain bicycles is the length of the load path between the rear wheel support means and the front wheel support means at the lower end of the front fork. Load paths of the lengths found in conventional bicycles are sufficiently long to significantly aggravate the stress loadings experienced by bicycles of the mountain type. Such aggravated stress loadings can cause early frame failure, particularly during off road racing. Furthermore, the complexity of conventional bicycle structures, either of the triangular or monocoque type, make a proper balancing of the foregoing factors extremely difficult to achieve as a practical matter.

DISCLOSURE OF THE INVENTION

The above problems are remedied by the present invention which provides a generally hollow bicycle frame made of composite materials and having a generally hollow main tubular portion and a generally hollow cross tubular portion arranged in a generally X-shaped configuration, and a method of making this improved composite bicycle frame. The main tubular portion and the cross tubular portion are integrally united by a single generally hollow common junction positioned intermediate to the ends of each of the tubular portions. The cross tubular portion is positioned along the main tubular portion and at an angle thereto, and the legs of these two portions on either side of the common junction are sized, such that a highly desirable balance is obtained between vertical compliance on the one hand and lateral bending rigidity and torsional rigidity on the other hand. The main tubular portion is preferably substantially straight to provide the shortest possible load path between the front wheel support means at the bottom of the front fork and the rear wheel support means at the rear of the frame. The cross tubular portion preferably also is substantially straight to provide the shortest possible load path between the pedal support means (the bottom bracket) and the seat support means).

The composite X-frame of the present invention provides a highly desirable degree of vertical compliance combined with both greater lateral bending rigidity and greater torsional rigidity, which greatly enhances the performance of a bicycle using this frame. By using composite materials and eliminating the vertical triangulation found in conventional "diamond" frames, which include both the conventional triangular frames and the conventional "monocoque" frames previously described, the composite X-frame provides greater vertical compliance while actually increasing both lateral bending rigidity and torsional rigidity.

The composite X-frame also enhances rider comfort and reduces rider fatigue. In marked contrast to conventional frames, the composite X-frame isolates the bottom bracket area from a direct load path between the front and rear wheel axles. Conventional frames route the normal weight loading, along with the peak loading of motion shocks, directly through the bottom bracket area via the down tube or other main body part and the chain stays. By eliminating the transmission of shock through the bottom bracket area, the composite X-frame greatly increases shock absorption and provides a corresponding increase in rider comfort and decrease in rider fatigue The composite X-frame most preferably is a unitary frame structure of tubular frame portions which have been integrally united to provide a substantially continuous wall of cured composite material between the different connected portions. In this specification, "integrally united" means that one or more first layers of uncured resin impregnated fabric were placed in overlapping contact with one or more second layers of uncured resin impregnated fabric and that at least one of the first and second layers was cured by a substantial amount after being so overlapped and while in contact. Preferably, both the first and second layers are cured by a substantial amount after being so overlapped and while in contact. The amount of the overlap is at least about ¼ inch, preferably at least about ½ inch, and more preferably at least about 1 inch. "Meldědly bonded" means an uncured portion or segment is integrally united to an uncured portion, or segment during the molding process. "Moldably bonded" means an uncured portion or junction is integrally united to a pre-cured segment or portion, or segment during the molding process. "Moldedly bonded" means the respective portions and/or segments are either meldedly or moldably bonded together. "Adhesively bonded" means a pre-cured portion or junction is joined to a pre-cured portion, respectively, by an adhesive composition applied in an uncured state and then cured to perfect a joint between abutting surfaces of the two previously cured components. The unidirectional orientation of substantially continuous fibers in the resin, matrix of the composite X-frame is believed to be another key factor in achieving these improved characteristics and in eliminating the problems of the prior art. Thus, it is believed that orienting a first substantial proportion of unidirectional fibers parallel to the longitudinal axis of each tubular portion and a second substantial proportion of unidirectional fibers on a diagonal to the axis of each tubular portion helps provide substantially greater vertical compliance while at the same time substantially increasing both lateral and torsional rigidity.

Accordingly, the composite X-frame assembly of the present invention is made preferably from substantially continuous unidirectional fibers impregnated with a moldable synthetic resin. The synthetic resin is preferably an epoxy type resin with a heat activatable hardener component. Such fiber reinforced synthetic resin material in the uncured state is commonly referred to as "prepreg". The continuous fibers may be either woven or unwoven fibers, unidirectional unwoven fibers being preferred. The unidirectional fibers are most preferably physically continuous from one end to the opposite end of each elongated strip of prepreg used in laying up the uncured shell from which the composite X-frame is molded. The unidirectional fibers also may be "substantially continuous", which in this specification means that immediately adjacent fibers are overlapped by a distance (believed to be about 1 inch) sufficient to provide substantially the same mechanical properties as physically continuous fibers. Of these shorter fibers, at least 50%, preferably 80%, more preferably 90%, and most preferably 95%, are at least 4 inches, preferably at least 6 inches, and more preferably at least 12 inches in length.

The specific type and quantity of fibrous material in the prepreg depends upon the frame characteristics desired, such as flexibility (compliance) in one or more directions, rigidity in one or more directions, compressive strength, tensile strength, shock absorption, vibration dampening and weight. Desirable fibers include glass fibers, carbon fibers, Kevlar fibers ("Kevlar" is a registered trademark of DuPont for its proprietary aromatic polyamide fibers), Spectra fibers ("Spectra" is a registered trademark of the Allied Fibers Division of Allied Signal for its proprietary polyethylene fibers): The fibers also may be of the low, moderate or high modulus type. A wide range of different fiber mixtures may be selected, depending upon the specific performance characteristics desired. Thus, while either all glass or all carbon fibers may be used, different mixtures of these fibers may be employed, such as 25, 50 or 75 percent by weight carbon fibers relative to 75, 50 or 25 percent by weight glass fibers. To these mixtures may be added various amounts of Kevlar 49 and/or Spectra fibers, such as up to 25% relative to the total weight of fibers. All percentages are by weight unless otherwise specified. In addition, to the main fiber layers may be added an inner layer (called a "scrim") of glass fibers to insulate an embedded metal part. There also may be provided an outer layer of unidirectional glass fibers positioned in a direction approximately normal to the tubular axis to provide hoop strength.

Numerous advantages are provided by the composite X-frame structure of the invention. Only two basic structural components are required, namely, a main tube portion and a cross tube portion, which simplifies manufacture and improves durability. In addition, the absence of a top tube or equivalent structure avoids potential injury to a rider straddling the bicycle frame, the main tubular portion being at a significantly lower position and having a larger transverse dimension.

The composite X-frame has aerodynamic advantages similar to a monocoque frame. This is because the main portion is slanted at a relatively small acute angle to the horizontal and is therefore relatively close to being parallel to the air stream, and there is only one steeply vertical cross portion compared to the four vertically steep tubes and stays of a conventional open-triangle frame. On the other hand, the X-frame eliminates the relatively large surface area and resultant cross wind sensitivity of the monocoque frames. At the same time, the numerous parts and pieces and assembly costs of conventional monocoque frames are avoided.

The composite X-frame is light in weight because of its high structural efficiency and composite structural materials. The structural efficiency is derived in part because no internal structural elements are required and the main tubular portion takes the shortest possible path between the front axle and rear axle load points. This substantially reduces the amount of physical structure required. Material costs also may be less because of less physical structure.

Even though it is light in weight, the composite X-frame has greatly improved rider comfort due to increased flexibility (compliance) in the vertical plane. Increased compliance in the vertical plane is due in part to increased flexure in the vertical plane of the main tubular portion and flexure of the cross tubular portion relative to the main tubular portion. Conventional diamond frames have very little vertical flexure due to the triangulation or rectangulation of the body members and the rigidity of the direct load path from the rear wheel axle up the seat tube and seat stays directly to the seat. Such lack of vertical flexure can give a harsh ride, particularly over rough terrain.

The composite X-frame also provides greater clearance for the rear wheel assembly in that the frame has no structure equivalent to the seat stays which connect the seat post junction to the rear wheel supports of conventional frames. In addition, the rear stay segments of the composite X-frame are positioned above the level of conventional chain stays and out of the way of the forward runs of the drive chain. On conventional bicycles, the problem of chain stay to wheel clearance may be particularly critical for the right hand chain stay, which sometimes must be recessed to provide the necessary chain clearance. Furthermore, since the upper chain run between the sprocket and the rear wheel assembly of the composite X-frame does not have to cross over the top of a chain stay, a significantly wider range of gearing can be employed.

The composite X-frame simplifies the determination of structural dynamics such that it may be easier to predictably achieve the desired performance characteristics. For example, the composite X-frame eliminates some of the very complex stress relationships encountered with conventional diamond frames, particularly in the bottom bracket area where lateral deflections of the bottom bracket under pedal loadings may cause the entire frame to twist and bend, which in turn may cause a significant loss of rider energy. On the other hand, with the composite X-frame, lateral deflections of the bottom bracket are reduced to only relatively small deflections of the lower segment of the cross portion. The resultant torsional loadings are easily carried by the relatively large cross-section of the main tubular portion. The composite X-frame structure therefore very efficiently handles high stress loadings with minimal deflection of the overall structure in either the torsional or laterally bending modes.

BRIEF DESCRIPTION OF THE DRAWINGS

The invention may be further understood by reference to the description below of specific embodiments taken in conjunction with the accompanying drawings in which:

FIG. 2 is a perspective top view of the bicycle frame of FIG. 1;

FIG. 3 is a perspective rear view of the bicycle frame of FIG. 1;

FIG. 4 is a sectional view along lines 4—4 of FIG. 1;
FIG. 5 is a sectional view along lines 5—5 of FIG. 1;
FIG. 6 is a sectional view along lines 6—6 of FIG. 1;
FIG. 7 is a sectional view along lines 7—7 of FIG. 1;
FIG. 8 is a sectional view along lines 8—8 of FIG. 1;

FIG. 13 is a modified bicycle frame according to the invention wherein the tubular portions have non-circular aerodynamic cross-sectional shapes;

FIG. 14 is a sectional view along lines 14—14 of FIG. 13;

FIG. 15 is a sectional view along lines 15—15 of FIG. 13;

FIG. 16 is a sectional view along lines 16—16 of FIG. 13;

DETAILED DESCRIPTION OF BEST MODE AND OTHER EMBODIMENTS

Figure 1:
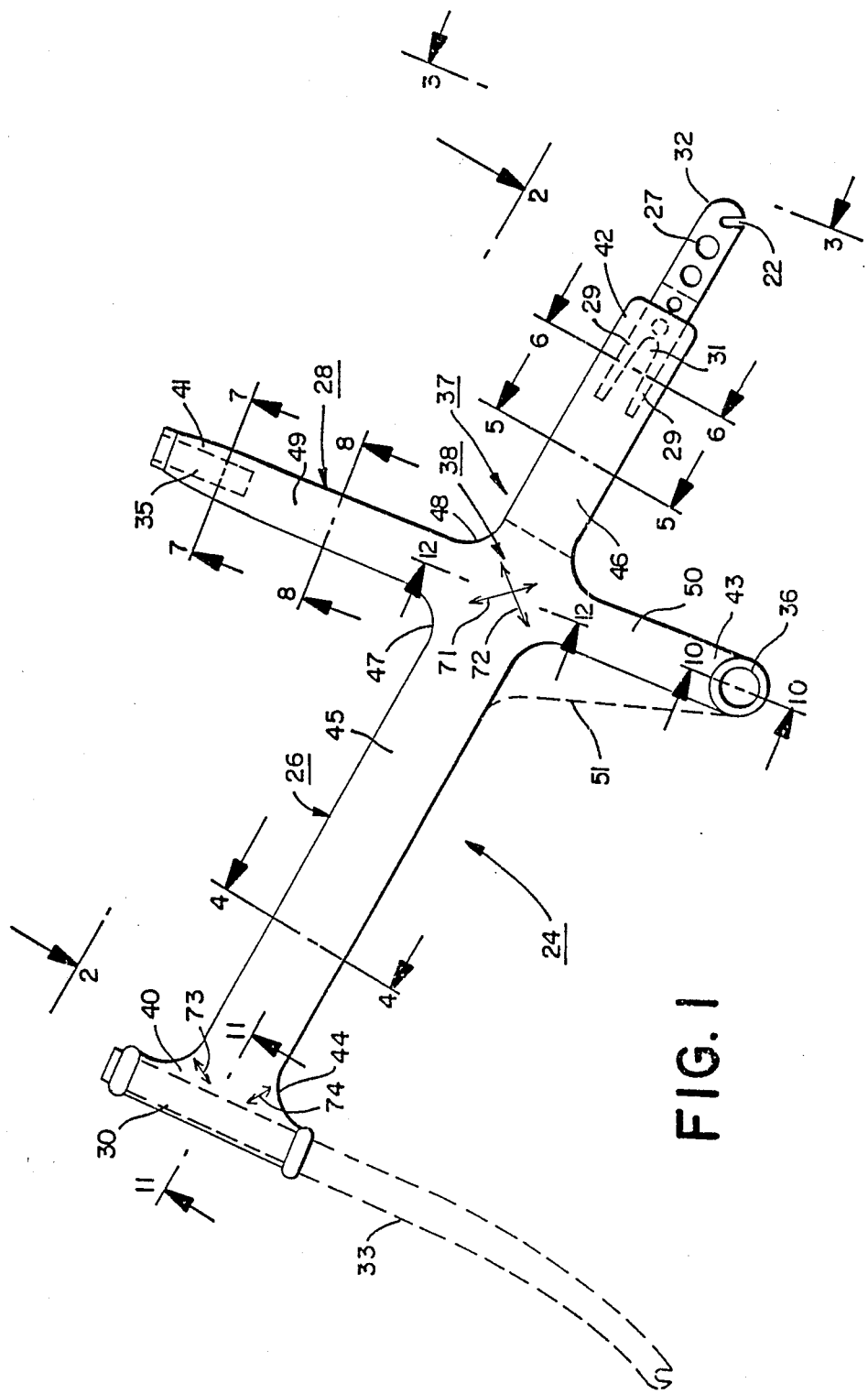
FIG. 1 is an elevational side view of a bicycle frame according to the invention.

Referring to FIGS. 1–3 and 9, there is shown a composite X-frame, generally designated 24, having a main tubular portion 26 and cross tubular portion 28. Main tubular portion 26 extends in a substantially straight line between and connects a head tube sleeve 30 with a pair of rear wheel dropouts 32, 32'. Each of the rear wheel dropouts comprises an elongated metal plate having a slot 22 for receiving a corresponding end of the rear wheel axle, a series of apertures 27 for minimizing the weight of this element, and a pair of tines 29-29 for anchoring each dropout in a corresponding rear end junction of a pair of rear stay tubular portions 46, 46', which together constitute a longitudinally divided rear segment of main tubular portion 26. Head tube sleeve 30 forms part of a steering support means for a front fork member 33 shown in broken lines. Rear dropouts 32, 32' form part of a rear wheel support means for a rear wheel assembly (not shown). Cross tubular portion 28 extends in a substantially straight line between and connects a seat tube sleeve 35 and a bottom bracket sleeve 36. Seat post sleeve 35 forms part of a seat support means for a seat assembly (not shown), and bottom bracket sleeve 36 forms part of a pedal support means for a pedal axle and chain wheel assembly (not shown).

Main tubular member 26 and cross member tubular member 28 are each generally hollow and are integrally united by a generally hollow common junction 38. Also provided are a generally hollow head junction 40 for carrying head sleeve 19, a generally hollow seat junction 41 for carrying seat tube sleeve 35, a pair of generally hollow rear end junctions 42 and 42' for carrying rear wheel dropouts 32 and 32', respectively, and a generally hollow pedal junction 43 for carrying bottom bracket sleeve 36. The junction 40 is fared into head tube sleeve 30 by a fillet 44 extending entirely around the forward end of main tubular portion 26, and junction 38 is fared into both main tubular portion 26 and cross tubular portion 28 by fillets 47 and 48, respectively, which extend entirely around main tubular portion 26 and partially around cross tube 28 where they meet at about the mid-point of each side of junction 38.

A particularly important feature of the present invention is the angular relationship between main tubular portion 26 and cross tubular portion 28. Also of particular importance is the angle between the main tubular portion 26 and the head tube sleeve 30. For simplicity, the angles of all of these components are defined relative to the longitudinal axis thereof and the horizontal plane in which the bicycle frame is designed to be ridden. Using this convention, the main tubular portion is at an angle to the horizontal preferably in the range of 15° to 30°. The specific angle selected for the main tubular portion depends to a large degree upon the wheel base of the bicycle as measured in a straight line between the rotational axis of the front wheel and the rotational axis of the rear wheel. Therefore, the more preferred angles are 29° for a 38 inch wheel base, 28.5° for a 39 inch wheel base, 28° for a 40 inch wheel base, and 26° for a 42 inch wheel base. In this regard, the wheel base for a composite X-frame mountain bike is in the range of 40-42 inches, and the wheel base for a composite X-frame road bike is in the range of 38-40 inches.

With respect to cross tubular portion 28, the longitudinal axis of this portion is preferably at an angle relative to the horizontal in the range of 58° to 85°, more preferably 68° to 76°. The upper end (76°) of this latter range is more preferred for racing frames and the lower end (68°) of this latter range is more preferred for touring frames because the lower angles provide greater compliance for improved rider comfort, but may provide too much compliance for the rigors of racing. The head tube angles relative to the horizontal are preferably in the range of 60° to 80°, more preferably 68° to 76°. A head tube angle of 76° is more preferred for a 38 inch wheel base and a head tube angle of 68° is more preferred for a 42 inch wheel base. The respective lengths of the main and cross tubular portions, the position of the interconnecting common junction along the main tubular portion, and the angle between these two portions are such that the distance between the rotational axis of the pedal axle and the rotational axis of the rear wheel axle is preferably in the range of 15 to 19 inches, more preferably about 17 inches for a mountain bicycle and 16 inches for a road racing bicycle.

Another important parameter of the composite X-frame is the bottom bracket drop dimension, which is the position of the center line of the bottom bracket sleeve relative to a straight line between the front and rear wheel axes. This position is specified by the distance of the bottom bracket sleeve below (the plus direction) or above (the minus direction) this imaginary straight line, the bottom bracket drop being zero when the sleeve axis and the straight line coincide. For standard wheel sizes in the range of 26 to 27 inches, the preferred bottom drop dimension is 0 to plus 3 inches for both mountain and road type composite X-frames. The range of this parameter is preferably minus 1 inch to plus 2 inches for standard 24 inch wheels, and minus 3 inches to zero for standard 20 inch wheels. These preferred dimensions for the bottom bracket drop will be different where the front and rear wheels are of different sizes, but it is believed that those skilled in the art can arrived at an appropriate bottom bracket drop for such designs from the information given here.

The main tubular portion 26 has a front segment 45 and a rear segment 37 comprising a pair of rear tubular portions 46 and 46′, which diverge rearwardly as illustrated in FIGS. 2-3. The cross tubular portion 28 has an upper segment 49 and a lower segment 50. Lower segment 50 may either of uniform cross-section as shown by solid lines, or may have a conical oval cross-section with an enlarged upper base joining main tubular portion 26 as illustrated by the broken line 51 in FIG. 1. A lower conical segment with a tapering oval cross-section is preferred to provide a stronger, less deflectable platform in which to mount the bottom bracket sleeve 36 and a corresponding pedal axle and chain wheel assembly (not shown). As seen best in FIGS. 1 and 3, the upper end of cross tubular portion 28 tapers radially inward until its diameter is only slightly larger (for example, by about ⅛ inch) than the diameter of seat tube 35. The inward facing outer surfaces of rear tubular portions 46 and 46′ are also fared together in a transverse fillet 53 as seen best in FIGS. 2 and 3.

As may be seen from a comparison of FIGS. 4 and 8, the main tubular portion 26 preferably has a significantly larger diameter than the cross tubular portion 28. The larger diameter of main tubular portion 26 is preferably in the range of about 2.5 to about 4.0 inches, more preferably about 3.0 inches. The smaller diameter of cross tubular portion 28 is preferably in the range of about 1.5 inches to about 2.5 inches, more preferably about 2 inches. Where the diameter of cross tubular portion is about 2 inches, it tapers at its upper end to about 1.25 inches relative to a seat post sleeve 35 having an outside diameter of about 1 ⅛ inches. Referring to FIG. 5, the rear tubular portions 46 and 46′ have a non-circular cross-section and, although they have separate and distinct walls defining generally hollow interior cavities, these cavities are preferably filled with a solid core 55 of synthetic resin foam. The walls of rear tubular portions 46 and 46′ each include a longitudinally extending joint 56 formed from overlapped edges of prepreg material as described further below. Referring now to FIG. 6 the tines 29-29 of rear wheel dropout 32 and 32′ fit within a pair of longitudinally tapered notch 59 provided in the rear end portion of the corresponding core 55. The pair of notches 59 taper inwardly as they extend rearwardly so that they conform to the shape of the space 31 between tines 29-29, the shape of space 31 being shown best in FIG. 1.

Figure 12:
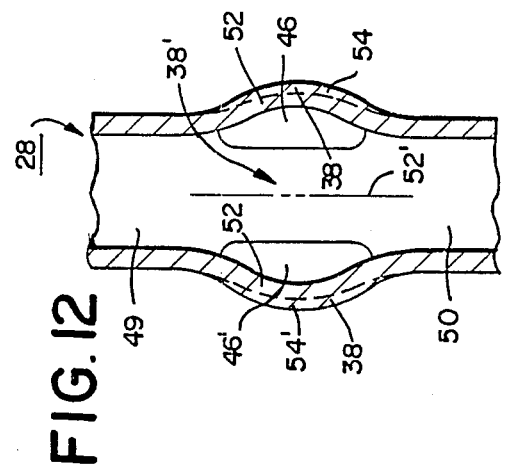
FIG. 12 is a fragmentary sectional view along lines 12—12 of FIG. 1.
Figure 11:
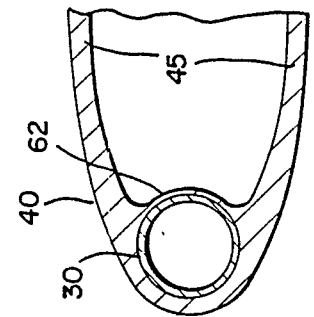
FIG. 11 is a fragmentary sectional view along lines 11—11 of FIG. 1.
Figure 10:
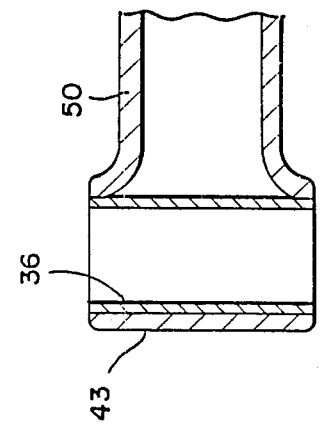
FIG. 10 is a fragmentary sectional view along lines 10—10 of FIG. 1.

Referring now to FIG. 7, the lower portion of metal seat tube 35 is surrounded by a tapered shim 60 of solid resin foam so that the entire length of seat post sleeve 35 is securely supported and bonded to the surrounding upper end junction 41 of cross tubular portion 28. With reference to FIG. 10, bottom bracket sleeve 36 is securely embedded in the composite material of lower end junction 43. Similarly, as shown in FIG. 11, head tube sleeve 30 is securely embedded in the composite material of junction 40 by a surrounding scrim 62 of a resin impregnated fibrous material. As illustrated in FIG. 12, the composite material of cross tubular portion 28 is integrally united to main tubular portion 26 by a common hollow junction 38 having a wall thickness which is greater than the combined wall thicknesses of tubular portions 26 and 28 as explained further below in connection with the method of making the composite X-frame of the invention.

The tubular portions of FIG. 1 are basically circular in cross-section, having been wrapped on an elongated mandrel having a circular cross-section or laid up in an elongated molding chamber of circular cross-section. However, the main tubular portion 26 and the cross tubular portion 28 may have non-circular aerodynamic cross-sections such as illustrated in FIGS. 13–16. These cross-sections may be achieved by wrapping the composite materials around elongated mandrels or laying them up in hollow molding chambers having corresponding non-circular aerodynamic cross-sections. The non-circular aerodynamic cross-sectional shapes are preferably symmetrical to the longitudinal plane of the bicycle frame (which coincides with the plane of symmetry in which both the front and rear wheels rotate and which passes through substantially the center of the geometric cross-sectional shape of the tire carried by these wheels), and extend along at least a major portion of the length of each elongated tubular portion and each elongated segment thereof, more preferably over substantially the entire length of each portion and segment.

Thus, for example, the front segment 67 of modified main tubular portion 26' may have an oval aerodynamic cross-sectional shape as shown in FIG. 14. Similarly, the modified cross tubular portion 28' may comprise an upper segment 68 having a tear drop aerodynamic cross-section as shown in FIG. 15 and a lower segment 69 having an alternative tear drop aerodynamic cross-sectional shape as shown in FIG. 16. The alternative tear drop shape of lower segment 69 includes a rear tube wall 70 which longitudinally follows a smooth curve substantially parallel to the outer circumference of a tire of the rear wheel assembly (not shown) as seen in FIG. 13, and has a concave transverse cross-section substantially following the transverse curvature of the outer surface of this rear tire as seen in FIG. 16.

Figure 17:
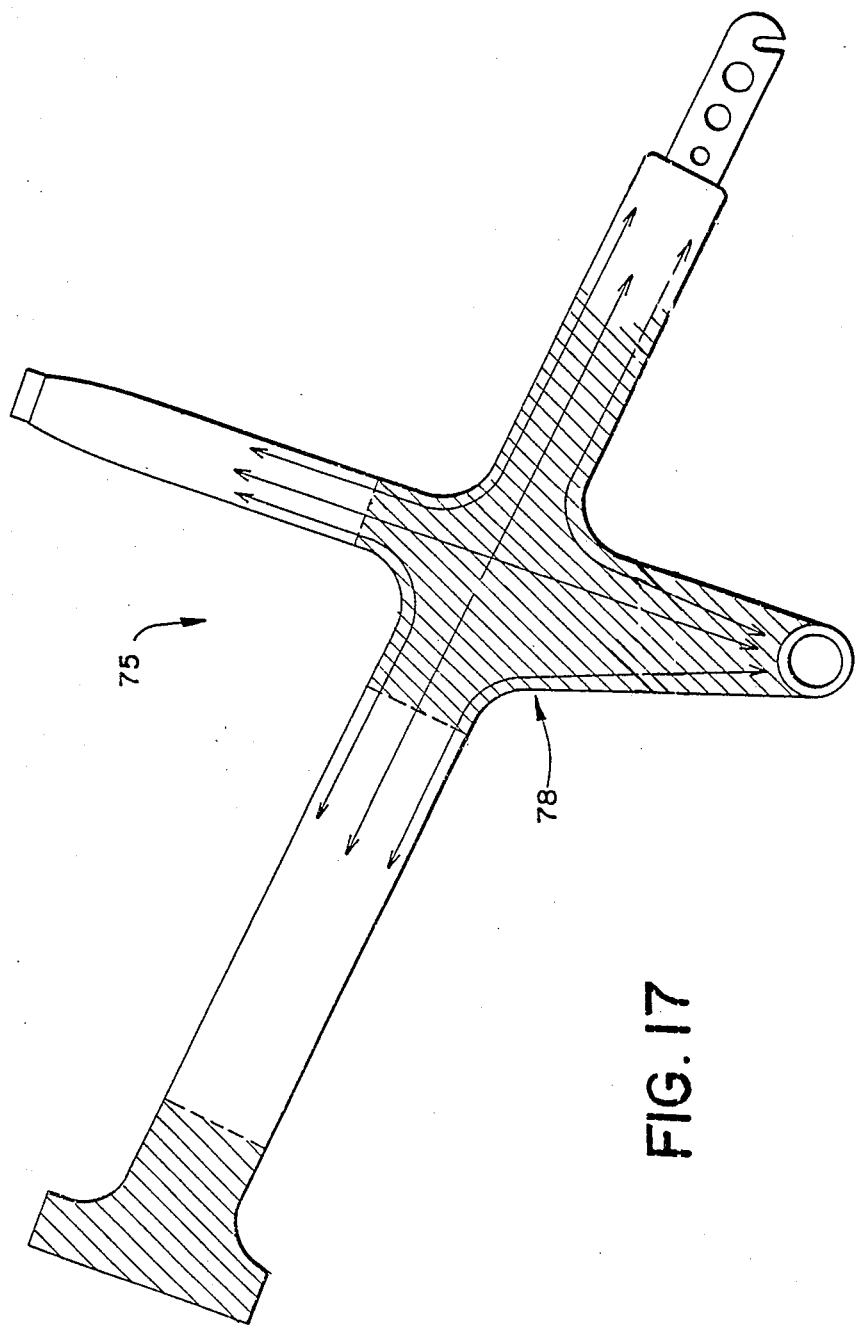
FIG. 17 is an elevational side view illustrating a method of making a bicycle frame according to the invention.

FIG. 17 of the drawings illustrates special frame reinforcing steps of the most preferred method of making a composite X-frame according to the invention. Following the reinforcement steps of FIG. 17, the assembled shell 75 containing inflatable bladders (not shown) is placed in a mold of corresponding shape and molded and cured in accordance with the production methods disclosed in applicant's co-pending U.S. patent applications Ser. No. 861,983 filed May 12, 1986, on "Tubular Bicycle Frame of Composite Material", and Ser. No. 123,338 filed Nov. 20, 1987, on "Method of Molding Composite Bicycle Frames", the entire contents of each of these applications being expressly incorporated herein by reference.

As an alternative to laying up the complete shell 75 in a mold as shown in the drawings of the above-referenced prior applications, the main tubular portion and the cross tubular portion of the present invention are preferably pre-wrapped on correspondingly shaped mandrels, and then removed from these mandrels and united with the use of strips and/or patches of composite material (preferably resin impregnated unidirectional fibers) to form an uncured X-shaped shell generally of the same shape as the finally cured X-frame. In other words, the tubular portions are pre-wrapped by wrapping uncured resin impregnated fibrous material on two mandrels having the approximate shapes and sizes of the interior cavities of the corresponding tubular portions of a finished composite X-frame. The tubular portion thus formed on each mandrel is removed in an uncured state and the two individual portions are then connected with additional strips and/or patches as described further below to provide an uncured shell from which the composite X-frame is molded. Before the individual tubular portions of the shell are connected and sealed together in final form, inflatable bladders, such as those described in the above-referenced prior applications, are inserted into and pulled through the cross tube portion and the front segment and a hollow junction segment of the main tubular portion. Although the bladder for the main tubular portion may extend into the dual rear segments for forming the rear stay portions, the rear stay segments are preferably filled with a core of synthetic resin foam of sufficient lateral dimensions to firmly press the stay walls against the corresponding inside surface of the mold in which the shell is ultimately cured to form the composite X-frame.

As the portions of the frame shell are being assembled, the metal sleeves 30, 35 and 36 and the rear wheel dropouts 32 and 32' are wrapped into a corresponding end part of the tubular portions to form a corresponding end junction, thereby embedding the corresponding metal piece in each end junction using flaps formed by cutting the corresponding tubular end part and additional strips and/or patches of resin impregnated fabric. During or after the individual portions of the frame shell are assembled, exterior openings are provided through the uncured shell for exiting inlet extensions of the internal bladders so that these extensions may be connected to an airline by connectors of the type described in the above referenced prior applications.

To separately manufacture the round main tubular portion 26 and the round cross tubular portion 28 of FIG. 1, resin impregnated fiber strips are wrapped around cylindrical mandrels of circular cross-section to provide corresponding round tubular structures. To separately manufacture the non-circular aerodynamic tubular portions of FIG. 13, the main tubular portion 26' and the cross tubular portion 28' are separately produced by wrapping resin impregnated fiber strips around cylindrical mandrels having corresponding non-circular aerodynamic cross-sectional shapes.

Depending upon the strength characteristics desired in the particular portions being formed, some of the strips may be spirally wound and some may be wrapped longitudinally (that is lengthwise preferably from a strip of unidirectional fibers having about the same length as the corresponding tubular portion) to provide multiple layers of resin impregnated fibrous material. Spiral windings are made in at least two successive layers which are preferably wound in opposite directions using long strips of resin impregnated unidirectional fibers, with the strips being preferably about 1 to 6 inches in width depending on the winding location. Preferably, windings of a strip in the same layer do not overlap but abut edge to edge in order to ensure an even surface finish. Each layer, whether spirally or longitudinally wrapped, preferably comprises a plurality of unidirectional fibers each of which is substantially continuous, more preferably physically continuous, substantially from one end to the opposite end of the tubular portion being formed.

The outside dimensions of the wrapping mandrel approximately correspond to the finished inside diameter of the particular portion being produced. Each portion is built up layer by layer around the mandrel. The number of layers used depends upon the desired wall thickness and corresponding performance characteristics of the particular portion being made for the finished frame. For example, about 8 layers of some prepregs have been found to produce a wall thickness in the finished frame portions of about 60 mils. Following wrapping, the tubular portions are slid axially off of the mandrel and assembled as described below.

The direction of wrapping the layers in relation to the longitudinal axis of each portion is an important factor in the performance characteristics of that portion. When the preferred unidirectional fibers are used, about ¼ to about ¾, preferably about ½ of these fibers may be positioned at an angle between 10° and 45°, preferably about 25°, relative to the longitudinal axis of the elongated tubular portions, with the remaining fibers being generally parallel (0°) to the longitudinal axis. The angle is preferably increased for the two rear stay tubular portions, the most preferred angle of spiral windings for these stay portions being about 70° to the longitudinal axis thereof. These orientations of fibers are believed to improve the strength of these members for carrying bending and torsional stresses, while allowing greater vertical compliance for shock absorption and rider comfort. It also should be clear that the angled layers can be spirally wound so that the next successive 25° layer can be wound from the opposite axial direction at an angle of 130° relative to the previous 25° layer.

Alternatively, the front segment 45 and the dual rear segments 46 and 46' of main tubular portion 26, and the upper segment 49 and the lower segment 50 of cross tubular portion 28, may be formed as separate uncured or precured tubular segments and united together by a common hollow junction made solely from junction patches in accordance with the techniques described in the above referenced prior applications. Also as described in those prior applications, stub type connectors (not shown here) may be used either to integrally unit or to adhesively bond the rear stay tubular portions, as well as one or more of the other tubular segments, to the common junction 38.

However, the main tubular portion 26 and the cross tubular portion 28 are each preferably made as a single continuous uncured tubular shell portion, and are then crossed and joined as described more particularly below. In forming these continuous tubular portions, prepreg layers having unidirectional fibers extending continuously between opposite ends of the tubular portions are most preferred (some fiber breakage may exist, but preferably does not exceed 20% more preferably 10%, and most preferably 5%). However, shorter unidirectional fibers may be used, but the length of at least 90% of these fibers preferably exceed 4 inches, more preferably 6 inches, and most preferably 12 inches. It is believed that if immediately adjacent shorter unidirectional fibers of an uncured prepreg material overlap by at least ½ inch, mechanical strength and other mechanical properties will be transferred between the two immediately adjacent but separate fiber segments as if the two segments were one physically continuous fiber. Therefore, for purposes of this specification, the unidirectional fibers are considered substantially continuous from one end to the other end of each tubular portion, provided that individual fibers immediately adjacent to each other are at least 4 inches in length and overlap by at least ½ inch. However, to insure mechanical integrity, fiber overlaps are preferably at least 1 inch, more preferably at least 2 inches.

The most preferred method of making the X-frame of the invention will now be described. In wrapping the main tubular portion, a 40 inch wide sheet of prepreg of a length corresponding to the length of the main portion is wrapped lengthwise (longitudinally) about 4 times around the mandrel to give 4 layers of unidirectional fibers parallel (0°) to the longitudinal axis of the portion being formed. A 6 inch wide strip of prepreg is then wrapped spirally on top of the lengthwise wraps to provide 4 layers of unidirectional fibers at an angle of 20° to 30°, preferably 25°, to the longitudinal axis of the portion being formed. The spiral windings of adjacent layers are in opposite axial directions so that the angle between fibers in successive spiral layers are at an obtuse angle of about 130° relative to each other. The resulting wall thickness of the main tubular portion is about 1/16 of an inch and the diameter of the tube is about 2.5 to 4 inches, preferably 3.0 inches.

Figure 9:
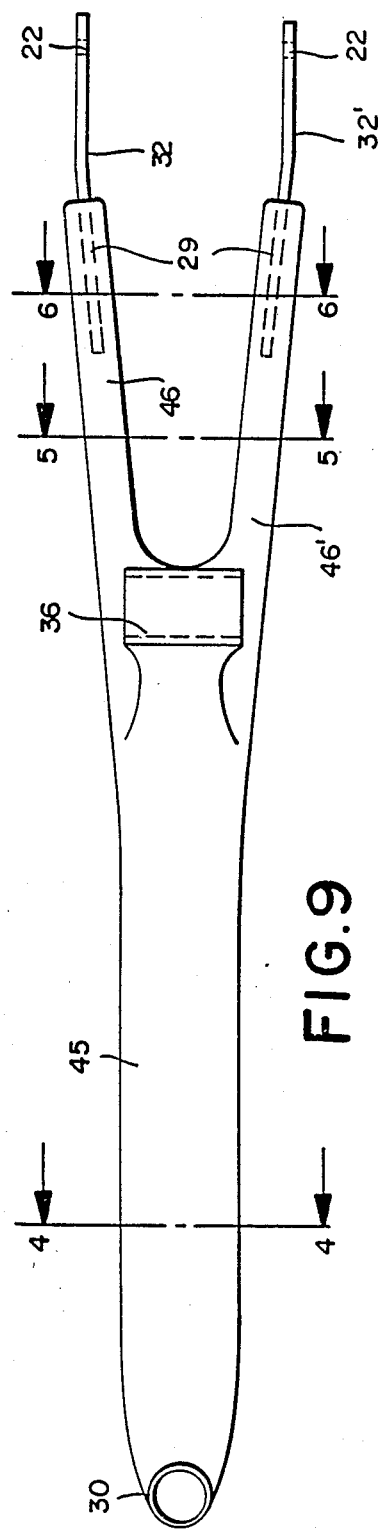
FIG. 9 is a perspective bottom view of the bicycle frame of FIG. 1.

The cross tube portion is made in the same fashion, except that the prepreg sheet wrapped lengthwise is about 24 inches wide since this tube is of smaller diameter (1.5 to 2.5 inches, preferably 2 inches) requiring less width of material for four longitudinal wraps. The main tubular shell is removed from its mandrel and then a rear end segment 37 is slit in the longitudinal plane of the frame and spread apart to provide two arms for forming the walls of the two rear stay portions. The cross tubular shell is removed from its mandrel and an intermediate or junction segment 52 of this shell is slit along the longitudinal plane of the frame (as represented by broken line 52' in FIG. 12) and spread apart to form a junction cavity 38', thereby shortening the length of the cross tubular shell by the amount required for this expansion of the intermediate junction segment. The bases 54 and 54' of the two arms formed by the slit rear segment 37 of the main shell is then wrapped around either side of the expanded portion of the cross shell (FIG. 12) with the free ends of these arms diverging outward at about the angle of the rear stay tubular portions 46 and 46' as shown in FIGS. 2, 3 and 9.

To complete the rear stay tubular portions 46 and 46', the relatively flat arm extensions resulting from longitudinally slitting the rear segment of main tubular portion 26 are folded lengthwise around a solid foam core piece 55 and the associated tines 29-29 of the rear wheel dropouts 32 and 32'. These tines extend into corresponding rear end junctions 42 and 42' by at least about 2 inches preferably at least about 4 inches. To securely embed the tines 29-29 of the rear wheel dropouts, these tines are fitted within notches 59 along the top and bottom edges of core piece 55 and are coated with a resin adhesive filled with chopped fibers, this adhesive and fiber mixture being indicated by the numeral 61 in FIG. 6. The size of the foam core 55 and the dropouts are such that the lengthwise wrap of the arm extensions overlap by at least ½ inch, preferably ¾ inch, to provide the longitudinally extending joint 57 shown in FIGS. 5 and 6 (the main and cross tubular portions will have a similar longitudinally extending joint if laid up directly in a mold instead of on a mandrel in accordance with one of the alternative manufacturing techniques described in co-pending application Ser. No. 123,338). When the resin is cured, the overlap joint 57 forms a substantially continuous tubular wall for rear stays 46 and 46', joint 57 having mechanical properties equivalent to the non-overlapped portions of the wall. To increase the strength of the rear stay segments, they each may be spirally wound with a 1 to 2 inch wide strip of prepreg to provide two oppositely slanted layers each at an angle of about 70° to the longitudinal axis of the stay segment.

To provide additional runs of continuous fibers completely across the area of junction 38 from the bottom segment 50 respectively to the front segment 45, the upper segment 49 and the two rear segments 46, 46', one or more layers of long 1 inch strips are laid down on the surface of the shell as formed at this stage so as to extend from bottom bracket sleeve 36 entirely along bottom segment 50 across the junction 38 and for a substantial distance, preferably 2 inches and more preferably 4 inches, along the adjacent surfaces of the rear part of front segment 45, the lower part of upper segment 49 and the front part of rear segments 46 and 46', respectively, as illustrated best in FIG. 17. So that these narrow strips can be bent in the plane thereof when laid flat relative to the longitudinal plane of the frame as a whole, relatively short slits may be provided in the area of the required bend at $\frac{1}{4}$ to $\frac{1}{8}$ inch intervals across the width of the strips, and this area also may be heated to provide a pliable segment that is more easily contoured around the bend from the lower segment 50 onto the parts of the main tubular portion fore and aft of junction 38. Adjacent strips are placed substantially in abutment until substantially at least one entire layer of such strips is provided over and adjacent to the common junction. The thickness of these narrow strips is preferably 12 to 48 mils, more preferably about 24 mils. The junction thereby created between the main shell and the cross shell is then cross wrapped at least once, more preferably four times, in two directions with a long strip of 2 inch wide prepreg to form the outer portion of common hollow junction 38 and transition fillets 47 and 48.

To reinforce the lower or base portion 50 of the cross tubular portion 28, this base portion may be formed as an oval conical segment as illustrated by the dotted line 51 in FIG. 1. This may be accomplished by slitting the junction 38, bottom segment 50 of the cross shell and a rear portion of front segment 45 of the main tubular portion longitudinally in the plane of the frame and from the front side thereof to provide an expandable area of these segments. The slit portion is then expanded into an oval shape and the resulting front opening is overlapped by at least $\frac{1}{2}$ inch on each side with a 4 inch wide or layer strip of prepreg material to close and seal both the bottom segment 50 and the adjacent slits in junction 38 and forward segment 45. The slit provided for this base portion of the cross shell may also be used to pull an expandable bladder through seat tube sleeve 35 down the full length of cross tubular portion 28.

Referring now to FIG. 11, opposing wall parts of the front end of front segment 45 are slit longitudinally in the plane of the frame and the resulting flaps are wrapped closely around head tube sleeve 30 and the free ends thereof overlapped by at least $\frac{1}{2}$ inch, preferably about 1 inch and more preferably about 4 inches to form the main portion of head junction 40. To improve the adherence between the metal head tube sleeve and the surrounding shell wall, the sleeve is preferably wrapped with one or more layers of resin impregnated glass fiber to form a scrim 62 which is inserted along with the sleeve in the head junction 40. Similar scrims may be provided around the seat tube sleeve 35, bottom bracket sleeve 36 and the encased ends of the rear wheel dropouts 32 and 32', although this feature is not shown in the cross-sections of these parts in the drawings. Scrims with glass fibers are used because the glass is dielectric and avoids galvanic corrosion of the metal sleeves and other parts which they surround and insulate from carbon fibers and the like.

Opposing wall parts of the lower end of the cross shell are slit transversely to the plane of the frame and the resulting flaps are wrapped around the bottom bracket sleeve and overlapped to the same extent as the head junction flaps to securely embed the bottom bracket sleeve in the bottom junction 43. Only one wall part at the upper end of the cross shell is slit longitudinally in the plane of the frame, preferably from the rear side, so as to receive the seat tube sleeve and then the resulting longitudinally extending edges are wrapped closely around the seat tube and are overlapped by a varying amount starting at zero at the base of the slit and increasing toward the end where the overlap amount is at least about $\frac{1}{2}$ inch, more preferably about 1 inch, to securely embed the seat tube sleeve in the junction 41. This slitting and overlapping at the top of the cross shell forms a taper at the top of the cross tubular portion 28 as shown in FIG. 1. To provide the desired degree of overlap, the taper preferably reduces the diameter of the cross tubular portion at its upper end by at least about $\frac{3}{4}$ inch. So that the entire seat tube will be firmly anchored against the adjacent wall of the cross portion, a shim 60 (FIG. 7) of solid foam is provided and this shim is tapered from bottom to top so as to fill the space between the seat tube sleeve and the wall of upper junction 41 throughout the length of the sleeve.

In FIG. 17, there is shown the assembled but uncured shell 75 before it is enclosed within a mold and pressurized by an internal pressing means (not shown). At this stage, shell 75 already contains a pressing means in its generally hollow interior. The pressing means for the larger hollows provided in the cross portion, the forward segment of the main portion, and the common junction is preferably one or more inflatable bladders which are placed in these hollows and then inflated during curing to compress these surrounding walls of the shell against the inside surface of a surrounding mold. The internal pressing means for the smaller hollows of the rear stay segments may be a solid foamable core, which may be made entirely of foamable solid resin or may be made from an unexpandable rigid resin inner piece surrounded by an expandable adhesive resin composition in the form of a thin solid sheet or a viscous paste. Alternatively and most preferably, the pressing means in the smaller hollows of the stay segments is an unexpandable solid resin foam which is held in place by an unexpandable adhesive paste containing chopped reinforcing fibers. This solid unexpandable core is sized slightly larger than the ultimate size of the smaller hollows so as to cause compression of the surrounding walls of the rear stay segments when these segments are clamped forcibly between the surfaces of the mold pieces.

After assembly as shown in FIG. 17, the frame shell is placed in a mold, which preferably comprises a left side piece, a right side piece and rear piece which fits between the inside parts of the two diverging rear stay segments and the interconnecting rear wall part 53 of the common junction. Any expandable pressing means is then activated to compress the surrounding uncured layers of fiber and resin firmly against the inside surface of the mold and against any adjacent segments having a solid foam core already compressed by closure of the mold. Thus, any bladders used are inflated and the expansion ingredient of any expandable foams are activated. Such expanding ingredients are preferably of the heat activatable type.

The resin ingredient of the prepreg also is preferably heat activated. Therefore, when the curing process is initiated by applying heat to the mold, further compression of the layers of fiber and resin occurs as the pressure within any bladders and the pressure caused by expansion of any expandable foam cores increases as the temperature rises. When curing is complete, the frame is removed from the mold, and optionally, the inflatable bladders may be removed manually and the foam cores may be removed by dissolution in an appropriate solvent. Optionally, since the bladders are extremely light and the foam cores are relatively light because of their small size, the bladders and foam cores may be left in place. Although neither the bladders nor the foam cores are required for structural integrity of the composite X-frame, insertion of a solid foam core into an otherwise hollow stay may reduce by as much as about 30% the wall thickness (number of resin impregnated fiber layers) that would otherwise be required. For example, a tubular rear stay segment of resin impregnated fiber with a wall thickness of about 60 mils has about the same strength as the same stay with a wall thickness of about 42 mils and substantially filled with a rigid core of synthetic resin foam.

The prepreg used in making the shell may be obtained from the Fiberite Company of Orange, California. This prepreg preferably cures when heated to about 250° F. As previously indicated, any foamable cores used may comprise an elongated piece of rigid non-expandable resin foam wrapped with a thin flexible sheet of solid material made of a heat expandable adhesive composition. This adhesive composition preferably foams at the curing temperature of the prepreg, namely, about 250° F. Also, any one or more of the tubular portions may be compressed with a fluid expandable bladder. As an alternative to either a bladder and an expandable adhesive, any one or more of the tubular portions, including the rear stay segments, may be formed around a heat expandable solid resin foam, such as closed cellular structure made by from a polymethacrylimide resin available under the trademark Rohacell from Syro Industries of Orange, Connecticut. Rohacell foam is rigid at ambient temperatures, but softens to a plastic state and expands radially upon further foaming at temperatures in the range of about 300° F. to about 350° F., which may be too hot for some of the frame hardware, such as aluminum dropouts and/or sleeves. As a further alternative, one or more of the tubular portions, including the rear stay segments, may be shaped and assembled as the shell 75, and then filled with a liquid foamable resin of the type well known in foamable resin technology.

During assembly of the uncured shell, the preferred metal sleeves and dropouts are wrapped into their corresponding junctions as previously described. At this time, runs of semi-rigid tubing may also be inserted into the substantially hollow tubular portions and the interconnecting substantially hollow common junction so as to extend from an inlet fixture to an outlet fixture which may be embedded and molded as part of the frame to house the fixture in a corresponding faring at the surface of the frame adjacent to the mounting for an associated component of external bicycle hardware. Threaded pins and the like as mountings for this hardware also may be embedded and molded into the frame. The inserted runs of semi-rigid tubing are preferably made from 3/16 inch O.D. Nylon tubing and serve as housings for the cables that operate the gears, sprockets, brakes and other external hardware of the bicycle. Following the assembly of a complete frame shell containing all of the desired inserts, the mold is assembled and prepared for heat curing the frame. The mold is preferably a three-piece mold having an interior chamber which is the same size and shape as the desired exterior of the finished bicycle frame.

Sufficient layers of fiber and resin are laid up around a mandrel or core, or directly into one of the three mold pieces, to achieve the desired wall thickness of the corresponding portion or segment of the finally cured frame. With respect to the exemplary shell 75 of FIG. 17, the basic runs of the main tubular portion and the cross tubular portion have a thickness of preferably 25 to 60 mils, more preferably about 35 to about 50 mils. The major stress bearing areas, namely, the head junction 77 and the intermediate junction and bottom bracket bearing structure 78, which comprises all of the lower segment 50 or 51 of the cross tubular portion, a part of the upper segment of the cross tubular portion and parts of the front and rear segments of the main tubular portion, are reinforced with additional layers of prepreg until a wall thickness in the range of 50 to 125 mils, preferably 70-100 mils, is achieved in these areas. The increased wall thickness of the areas 77 and 78 may be achieved by cross-wrapping the area one or more, preferably at least four, times in each direction with a long strip of prepreg about 1 to 3 inches, preferably 2 inches, in width. The wall thicknesses of the different segments of the tubular portions, such as the rear stay segments and the upper segment of the cross tubular portion, may be varied further depending upon the desired compliance of each in the vertical plane.

Figure 18:
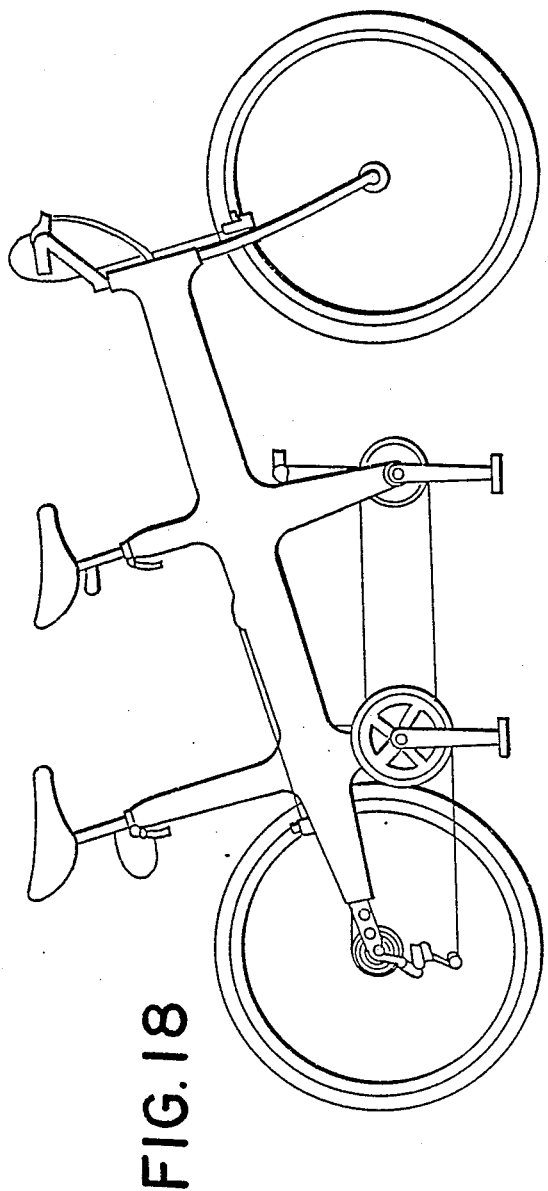
FIG. 18 is an elevational side view of a two rider bicycle employing a modified frame according to the invention.

The composite shell of FIG. 17 is for making a composite X-frame for a single rider bicycle. The same technique may be used for making a composite X-frame for the two rider bicycle illustrated in FIG. 18 and having two cross tubular portions. The two cross tubular portions are located a sufficient distance apart along the main tubular portion to provide pedaling space for the average size second rider. The angles previously given for the single cross tubular portion are usable for the dual cross tubular portions. However, the center of gravity for the two riders must be calculated and this center of gravity is preferably positioned along the main tubular portion at about the same location at which a single cross tubular portion would be placed along the length of the main tubular portion.

Examples of composite X-frames which were actually built and tested are given below. The examples specify how each frame was made and the test results follow these examples. In all of these frames, the wheel base was 42 inches, the pedal axle to rear wheel axle length was 17 inches, the angle between the main tubular portion and the horizontal was 26°, the angle between the cross-tubular portion and the horizontal was 72°, the angle between the head tube and the horizontal was 70°, the length of the main tubular portion was 38 inches, and the length of the cross tubular portion was 22.5 inches. In these examples, the Fiberite prepreg material used is referred to in these examples by the type of fibrous material since the epoxy impregnating resin was the same in all cases. In each of these examples, the head junction, the seat junction, the bottom bracket junction, the dropout junctions, the common junction and the rear stay segments are made in accordance with the method of formation described above. In this regard, the rear stay segments were made using an unexpandable foam core initially wrapped within a wall composition the same as that described in each of the examples for the main tubular portion.

In each of these examples, the layers with fibers oriented at 0° are made by longitudinal (lengthwise) wrappings or windings of a single elongated strip of prepreg of the width necessary to give the number of layers indicated. For example, two layers around the mandrel for the main tubular portion requires about a 40 inch wide strip and two layers longitudinally wrapped around the mandrel for the cross tubular portion requires a strip about 24 inches in width. Each of these layers extends longitudinally for substantially the full length of the corresponding tubular portion being formed. For the spirally wound layers, prepreg material of the appropriate length is cut into strips about 6 inches in width for the main tubular portion and about 4 inches in width for the cross tubular portion. With respect to the rear stay segments which are initially formed by longitudinally slitting the main tubular portion from the rear after it comes off its corresponding mandrel, each of the stay portions were wrapped around an unexpandable solid foam core and longitudinally overlapped as shown in FIGS. 5 and 6 and each resulting rear tubular stay segment was then spirally wound in each example with two layers of 2 inch wide 8 mil glass prepreg, one layer at 70° in the forward direction and the other layer at 70° in the rearward direction.

For all examples, the branched layers, which started at the bottom bracket and branched respectively into the front and rear segments of the main tubular portion and the upper segment of the cross tubular portion, were made of six layers of 1 inch wide, 8 mils thick, elongated strips and extends approximately 4 inches beyond the common junction into each of the three respective adjoining segments. On top of the branched layers were placed eight cross-wrapped layers, four in each of the directions indicated by the arrows 71 and 72 shown diagonally to the junction 38 in FIG. 1. These layers were built up from a single continuous strip of glass prepreg 2 inches in width and 8 mils thick. The additional layers for cross wrapping the head tube in the directions of arrows 73 and 74 also comprise eight layers, with four wraps in each direction, of 2 inch wide 8 mil thick glass prepreg (namely, the same material as for the cross wraps of the common junction).

The frame dimensions and other physical parameters of each of the composite X-frames tested were the same for the four examples. The length of the main tubular portions was 38 inches from rear wheel axle to center line of the head tube. The length of the cross tubular portions was 22 ½ inches from the center line of the bottom bracket sleeve to the top of the seat tube. The top end of the cross tubular portion and the seat tube sleeve both had a contiguous longitudinal slit from the rear of about 1 inch which was surrounded by a seat clamp with a corresponding slit for tightening the seat tube sleeve down on a seat post. The head tube sleeve was at 70°, the seat tube sleeve was at 72°, and the longitudinal axis of the main tubular portion was at 26°, all relative to the horizontal. The pedal axis to rear wheel axis distance was 17 inches with a wheel base between front and rear wheel axes of 42 inches. The drop distance of the pedal axis below a straight line between the front and rear axes was 1.5 inches.

EXAMPLE 1

The main and cross tubular portions of the shell as wrapped on a mandrel had a thickness of 48 mils and comprised a first layer of 24 mil thick glass fibers wrapped longitudinally (all longitudinal wraps provide a fiber orientation of 0°), second and third longitudinally wrapped layers of carbon fibers each 6 mils thick, and two layers of spirally wrapped carbon fibers with one 6 mil layer at plus 25° and the other 6 mil layer at minus 25° to the longitudinal axis of the mandrel. The common junction was then formed as previously described, including being cross wrapped with 1 inch strips as previously described.

EXAMPLE 2

The main and cross tubular portions were built up to a wall thickness of 48 mils from 8 mil strips of glass fibers, first by longitudinally wrapping four layers at 0° fiber orientation followed by two spirally wrapped layers, one at plus 25° and the other at minus 25° fiber orientations relative to the longitudinal axis of the respective tubular portions. A branched layer of 48 mil thick glass was then provided across the common junction as in all examples. This was followed by building up the head junction and the common junction for an additional 48 mils by cross wrapping 1 inch strips as described above.

EXAMPLE 3

The main and tubular portions were built up to a thickness of 32 mils by first longitudinally wrapping one layer of 8 mil glass, followed by longitudinally wrapping two layers of 6 mil thick carbon, followed by two layers of 6 mil carbon spirally wrapped at plus and minus 25°, respectively. The branched common junction layer was provided from 1 inch wide 6 mil thick strips of carbon fibers. Thereafter, the head junction and common junction were built up for an additional 48 mils by cross wrapping with 6 layers of 8 mil thick carbon.

EXAMPLE 4

The main and cross tubular portions were built up to a total thickness of 40 mils using three initial layers of 8 mil glass wrapped longitudinally (0° fiber orientation) followed by two layers of 8 mil glass one spirally wrapped at plus 25° and the other spirally wrapped at minus 25°. The branched layer across the common junction was then provided from 1 inch strips of 8 mil glass as described above. The head tube junction and common junction were then cross wrapped with six layers of 1 inch wide and 8 mil thick carbon for an additional thickness of 48 mils.

COMPARISON TESTING

Figure 19:
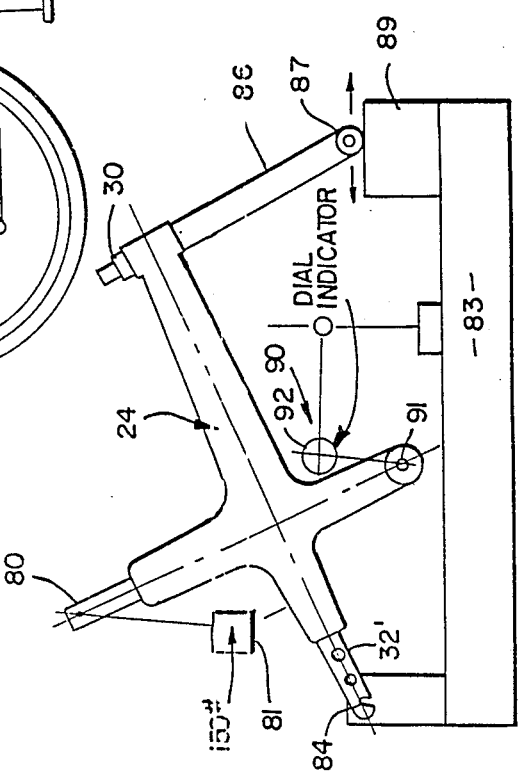
FIG. 19 is an elevational side view illustrating a set up for conducting a Vertical Compliance Test of a bicycle frame according to the invention; and, FIG. 20 is a chart of data from conducting Vertical Compliance, Lateral Bending Stiffness and Bottom Bracket Torsion Tests to compare different bicycle frames, including different bicycle frames according to the invention.

The results of comparison testing between the bicycle frames of the four examples above and conventional bicycle frames are presented in FIG. 20. The test data presented in the first column of FIG. 2 and labeled "Vert. Compliance" (that is, Vertical Compliance) was derived using the test set-up of FIG. 19. Referring to FIG. 19, the Vertical Compliance Test was performed by applying a 150 pound load to the end of a dummy seat post 80 with the load attachment 81 at the center line of the seat tube and 30 inches from the center line of the bottom bracket sleeve (which coincides with the rotational axis of the pedal axle). The frame 24 is mounted vertically on a test bed 83 by means of a dummy rear axle 84 which allows free pivotal motion of rear dropouts 32 and 32'. The head tube 30 is rigidly secured to a solid cylindrical steel bar 86 having at its base a roller 87 which is free to move back and forth on the flat upper surface of a test bed pillar 89. A deflection indicating instrument 90 is mounted on test bed 83 and has a feeler gauge connected to the center of the bottom bracket sleeve at 91. The deflection instrument 90 is calibrated at 0 deflection with the weight 81 removed and then the weight is added and the deflection of the bottom bracket caused by this weight is measured and is shown in inches on the dial 92 of deflection instrument 90. These dial readings in inches are given in the column head "Def.".

The second three columns of FIG. 20 are labeled "Klein Lat/Tor deflection". This heading refers to measurements of lateral bending and torsion deflections in inches as measured by the Lateral Bending Stiffness Test and the Bottom Bracket Torsion Test using the set-ups and testing techniques presented in U.S. Pat. No. 4,500,103 issued Feb. 19, 1985, to Gary G. Klein, the entire contents of this patent being expressly incorporated herein by reference. The latter deflections of FIG. 20 were obtained by applying a 15 pound weight to the dummy rear axle of Klein, and the torsional deflections were obtained by applying a 15 pound weight to the end of a 32 inch lever attached to the bottom bracket shell and extending through the center line of the seat tube in a manner equivalent to the Klein set-up, which used a slightly shorter torsion testing lever (30.5 inches). All deflections given in FIG. 20 are in inches.

The test results of FIG. 20 illustrate that the composite X-frame of the present invention provides a substantial increase in vertical compliance (vertical deflection measurements in the range of 0.060 to 0.080 inches), while at the same time providing greater lateral bending rigidity (lateral deflection measurements in the range of 0.050 to 0.100 inches) and greater torsional rigidity (torsional deflection measurements in the range of 0.400 to 0.600 inches). Only the Klein and Trek test bicycles had torsional rigidity comparable to the composite X-frame, and only the Ritchey test bicycle had lateral bending rigidity comparable to the composite X-frame. On the other hand, none of the conventional bicycles tested, including the Klein, Trek and Ritchey frames, had comparable vertical compliance by a factor of 2 to 3. Furthermore, the composite X-frame of Example III tied for the lightest weight with the Trek aluminum frame (3.5 pounds).

In line with the test results of FIG. 20, the composite X-frame of the prevent invention preferably has a vertical compliance deflection according to the foregoing Vertical Compliance Test of more than 0.025 inches, more preferably 0.040 inches, and most preferably 0.060 inches; a lateral bending deflection according to the Klein Lateral Bending Rigidity Test of preferably less than 0.180 inches, preferably 0.150 inches, and most preferably 0.125 inches; and a torsional deflection according to the Klein Torsional Rigidity Test of preferably less than 0.750 inches, more preferably 0.600 inches, and most preferably 0.450 inches.

What is claimed is:

1. A bicycle frame connecting a steering support means for rotatably supporting a front fork assembly, a seat support means for supporting a seat assembly, a pedal support means for supporting a pedal assembly, and a rear wheel support means for supporting a rear wheel assembly, said frame comprising:

a generally hollow main tubular portion extending longitudinally between said steering support means and said rear wheel support means and comprising at least one layer of fibrous material impregnated with a synthetic resin;

a generally hollow cross tubular portion extending longitudinally between said pedal support means and said seat support means and comprising at least one layer of fibrous material impregnated with a synthetic resin; and a generally hollow common junction connecting said main tubular portion and said cross tubular portion to form a generally hollow unitary bicycle frame having a substantially X-shaped geometry as viewed from one side thereof, said common junction providing a substantially continuous wall around an interior cavity of said generally hollow bicycle frame and comprising first and second intermediate segments of said main tubular portion and third and fourth intermediate segments of said cross-tubular portion, said first and third intermediate segments being overlapped and bonded together to provide a unitary wall connecting said main and cross tubular portions along one side of said common junction, and said second and fourth intermediate segments being overlapped and bonded together to provide a unitary wall connecting said main and crossed tubular portions along another side of said common junction.

2. A bicycle frame according to claim 1 wherein each of said intermediate segments comprises an intermediate part of a longer and continuous piece of material cut from a larger sheet of said resin impregnated fibrous material.

3. A bicycle frame according to claim 1 wherein opposite wall parts of the front end of said main tubular portion are wrapped around a head tube sleeve of said steering support means to form a head junction, the forward edges of said parts being overlapped to provide a molded juncture of overlapping layers of said resin impregnated fibrous material extending longitudinally in parallel to the axis of said head tube sleeve.

4. A bicycle frame according to claim 3 wherein said overlapped parts of said head junction are crossed wrapped in at least two directions with at least one elongated strip of said resin impregnated fibrous material, the runs of said cross wrapping alternating between respective fillets between said head tube sleeve and said main tubular portion on opposite sides of said main tubular portion.

5. A bicycle frame according to claim 1 wherein opposite wall parts of the lower end of said cross tubular portion are wrapped around a bottom bracket sleeve of said steering support means to form a bottom bracket junction, the forward edges of said parts being overlapped to provide a molded juncture of overlapping layers of said resin impregnated fibrous material extending longitudinally in parallel to the axis of said bottom bracket sleeve.

6. A bicycle frame according to claim 1 wherein a rear wall part of an upper end of said cross tubular portion has two opposing longitudinally extending edges wrapped around a seat tube sleeve of said steering support means to form a seat junction, the axis of said seat tube sleeve being substantially parallel with the axis of said cross tubular portion, and the uppermost parts of said edges being overlapped to provide a molded juncture of overlapping layers of said resin impregnated fibrous material extending longitudinally in parallel to the axis of said seat tube sleeve.

7. A bicycle frame according to claim 6 wherein a cut through a wall part of the outer end of said seat tube sleeve and through a portion of the outer end of said seat tube junction provides a slot defining a clamping segment contractible by a seat clamp for engaging the post of a seat assembly.

8. A bicycle frame according to claim 1 wherein said overlapped intermediate segments are meldedly bonded together such that said main and cross tubular portions are integrally united by said common junction.

9. A bicycle frame according to claim 1 wherein said overlapped intermediate segments are integrally united by a pressure molded bond.

10. A bicycle frame according to claim 1 wherein said tubular portions and said common juncture each comprise a plurality of said layers of fibrous material impregnated with a synthetic resin.

11. A bicycle frame according to claim 1 wherein each of said tubular portions has at least one layer of resin impregnated fibrous material with unidirectional fibers and said unidirectional fiber layer is wrapped lengthwise so that the direction of said unidirectional fibers is parallel to the longitudinal axis of the corresponding tubular portion.

12. A bicycle frame according to claim 1 in which each of said tubular portions has at least one layer of resin impregnated fibrous material with unidirectional fibers and said unidirectional fiber layer is wrapped lengthwise so that the direction of said unidirectional fibers is parallel to the longitudinal axis of the corresponding tubular portion; and wherein each of said tubular portions has at least one other layer of resin impregnated fibrous material with unidirectional fibers and said other unidirectional fiber layer is formed by spirally winding a strip of said resin impregnated fibrous material so that said unidirectional fibers are at an acute angle relative to the longitudinal axis of the corresponding tubular portion.

13. A bicycle frame according to claim 1 wherein said common junction comprises at least four layers of said resin impregnated fibrous material with unidirectional fibers, the fibers of a first unidirectional layer extending parallel to the longitudinal axis of said main tubular portion, the fibers of a second unidirectional layer extending parallel to the longitudinal axis of said cross tubular portion, the fibers of a third unidirectional layer extending at an acute angle relative to the longitudinal axis of said main tubular portion, and the fibers of a fourth unidirectional layer extending at an acute angle relative to the longitudinal axis of said cross tubular portion.

14. A bicycle frame according to claim 1 wherein the lower end of a lower segment of said cross tubular portion contains a bottom bracket sleeve, and wherein said lower segment has an oval cross-sectional shape and the outer configuration of an inverted cone when viewed from one side of said bicycle frame so as to provide structural reinforcement for supporting said bottom bracket sleeve.

15. A bicycle frame connecting a steering support means for rotatably supporting a front fork assembly, a seat support means for supporting a seat assembly, a pedal support means for supporting a pedal assembly, and a rear wheel support means for supporting a rear wheel assembly, said frame comprising:
   a generally hollow main tubular portion extending longitudinally between said steering support means and said rear wheel support means and comprising at least one layer of fibrous material impregnated with a synthetic resin;
   a generally hollow cross tubular portion extending longitudinally between said pedal support means and said seat support means and comprising at least one layer of fibrous material impregnated with a synthetic resin; and
   a generally hollow common junction connecting said main tubular portion and said cross tubular portion to form a generally hollow unitary bicycle frame having a substantially X-shaped geometry as viewed from one side thereof;
   wherein said common junction provides a substantially continuous wall around an interior cavity of said generally hollow bicycle frame and comprises an intermediate segment of said main tubular portion and an intermediate segment of said cross tubular portion, said intermediate segments overlapping each other in bonded contact to provide a unitary wall connecting said main and cross tubular portions at said common junction;
   wherein said main tubular portion comprises a pair of stay tubular portions connecting and extending between said common junction and said rear wheel support means, said stay tubular portions being formed from transversely separated parts of said main tubular portion; and,
   wherein each of said stay tubular portions has a longitudinally extending molded juncture of overlapping edges of said resin impregnated fibrous material, said juncture integrally uniting said edges to provide a substantially continuous wall around the interior cavity of said stay tubular portions.

16. A bicycle frame according to claim 15 wherein an elongated core of synthetic resin foam is in said interior stay cavity of each of said stay tubular portions, and said core is coated with a synthetic resin adhesive forming an adhesive bond between said core and said substantially continuous stay wall.

17. A bicycle frame according to claim 16 wherein a portion of a rear wheel support member is in said interior stay cavity along with said foam core, said support member has a pair of opposing tines and said foam core has a pair of longitudinally extending notches each receiving and engaging a corresponding one of said tines, and said resin adhesive adhesively bonds said tines to said foam core and to said continuous stay wall.

18. A bicycle frame connecting a steering support means for rotatably supporting a front fork assembly, a seat support means for supporting a seat assembly, a pedal support means for supporting a pedal assembly, and a rear wheel support means for supporting a rear wheel assembly, said frame comprising:
   a generally hollow main tubular portion extending longitudinally between said steering support means and said rear wheel support means and comprising at least one layer of fibrous material impregnated with a synthetic resin;
   a generally hollow cross tubular portion extending longitudinally between said pedal support means and said seat support means and comprising at least one layer of fibrous material impregnated with a synthetic resin; and a generally hollow common junction connecting said main tubular portion and said cross tubular portion to form a generally hollow unitary bicycle frame having a substantially X-shaped geometry as viewed from one side thereof;

wherein said common junction provides a substantially continuous wall around an interior cavity of said generally hollow bicycle frame and comprises an intermediate segment of said main tubular portion and an intermediate segment of said cross tubular portion, said intermediate segments overlapping each other on bonded contact to provide a unitary wall connecting said main and cross tubular portions at said common junction; and, wherein the resin impregnated fibrous material of said common junction comprises at least two layers containing unidirectional fibers, the unidirectional fibers of one of said layers extending substantially continuously across said common junction between the respective ends of said main tubular portion and the unidirectional fibers of said other layers extending substantially continuously across said common junction between the respective ends of said cross tubular portion.

19. A bicycle frame according to claim 18 wherein at least 80% of said unidirectional fibers are physically continuous between the respective ends of said main tubular portion and between the respective ends of said cross tubular portion.

20. A bicycle frame according to claim 18 wherein said substantially continuous unidirectional fibers comprise individual fibers at least 4 inches in length which overlap an immediately adjacent fiber by an amount such that the mechanical properties of said resin impregnated fibrous material are substantially the same as if said at least 4 inch long fibers where physically continuous between the respective ends of said tubular portions.

21. A bicycle frame according to claim 18 in which the resin impregnated fibrous material of said common junction further comprises an additional layer of said resin impregnated fibrous material in which substantially continuous unidirectional fibers extend from the pedal support means to positions on said frame across and beyond said common hollow junction, a first proportion of said positions being along a forward segment of said main tubular portion, a second proportion of said positions being along an upper segment of said cross tubular portion opposite a lower segment of said cross tubular portion carrying said pedal support means, and a third proportion of said positions being about equally distributed along each of two rear stay segments of said main tubular portion.

22. A bicycle frame connecting a steering support means for rotatably supporting a front fork assembly, a seat support means for supporting a seat assembly, a pedal support means for supporting a pedal crank assembly, and a rear wheel support means for supporting a rear wheel assembly, said frame comprising:

a generally hollow main tubular portion extending longitudinally between said steering support means and said rear wheel support means and comprising at least one molded layer of fibrous material impregnated with a synthetic resin;

a generally hollow cross tubular portion extending longitudinally between said pedal support means and said seat support means and comprising at least one molded layer of fibrous material impregnated with a synthetic resin; and a generally hollow common junction connecting said main tubular portion and said cross tubular portion to form a generally hollow unitary bicycle frame having a substantially X-shaped geometry as viewed from one side thereof, said common junction providing a substantially continuous wall around an interior cavity of said generally hollow bicycle frame and comprising first and second intermediate segments of said main tubular portion and third and fourth intermediate segments of said cross tubular portion, said first and third intermediate segments overlapping each other in moldedly bonded contact to provide a unitary wall integrally uniting said main and cross tubular portions along one side of said common junction, and said second and fourth intermediate segments overlapping each other in moldedly bonded contact to provide a unitary wall integrally uniting said main and cross tubular portions along another side of said common junction.

23. A bicycle frame according to claim 22 wherein said first and third overlapped segments are meldedly bonded together, and said second and fourth overlapped segments are meldedly bonded together.

24. A bicycle frame according to claim 22 wherein said overlapped first and third segments are moldably bonded together, and said overlapped second and fourth segments are moldably bonded together.

* * * * *